Patented June 14, 1938

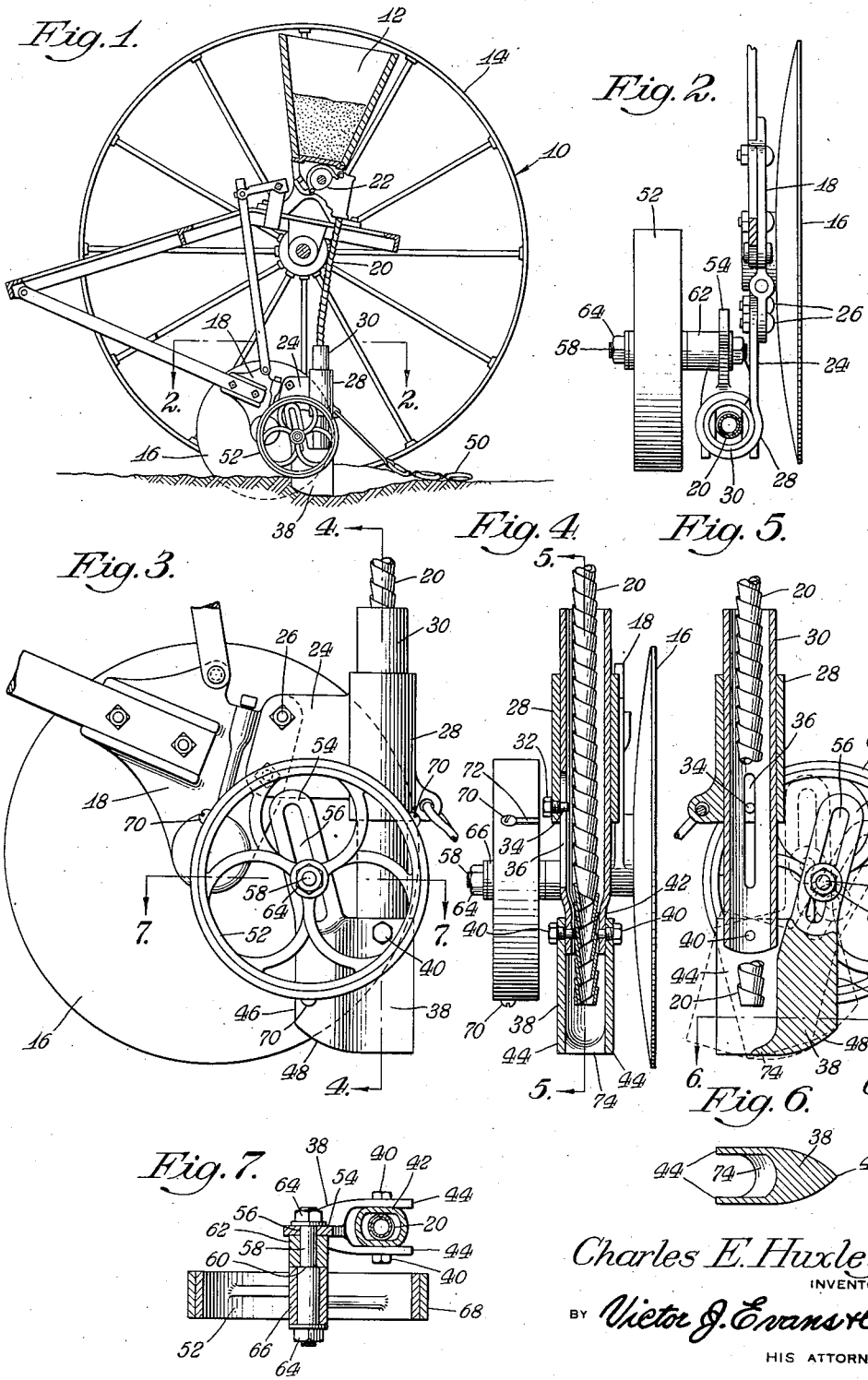

2,120,331

UNITED STATES PATENT OFFICE 2,120,331

UNIFORM DEPTH SEEDER

Charles E. Huxley, Chicago, Ill.

Application May 2, 1936, Serial No. 77,622

6 Claims. (Cl. 111—84)

My invention relates to agricultural machinery, and has among its objects and advantages the provision of an improved uniform depth seeder.

In the accompanying drawing:

Fig. 1 is a fragmentary view of a conventional grain drill showing my invention applied thereto;

Fig. 2 is a sectional view along the line 2—2 of Fig. 1;

Fig. 3 is a side view of the invention;

Fig. 4 is a sectional view along the line 4—4 of Fig. 3;

Fig. 5 is a sectional view along the line 5—5 of Fig. 4;

Fig. 6 is a sectional view along the line 6—6 of Fig. 5; and

Fig. 7 is a sectional view along the line 7—7 of Fig. 3.

In the embodiment selected to illustrate my invention, I make use of a conventional grain drill 10 including the usual grain box 12 supported at each end by a wheel 14. The grain drill includes a plurality of disc furrow openers 16, only one of which is illustrated. The disc 16 of Fig. 1 is rotatably carried by a casting 18. A flexible grain delivery tube 20 is associated with each disc 16, which tube has its upper end arranged in communication with a conventional feeding device 22 having communication with the grain box 12. The above described structure is old and well known in the art.

My invention comprises a uniform depth seeder which may be connected with each of the castings 18. When so attached, my seeder opens the furrow into which the grain is delivered, and the disc 16, together with the casting 18, serves as a mounting for the seeder. Specifically, the seeder comprises a casting 24 bolted at 26 to the casting 18 and terminating in a normally upright tubular support 28. I slidably arrange a tube 30 within the tubular support 28 and provide the tubular support 28 with a bolt 32 which has an end 34 loosely positioned within a slot 36 in the tube 30 limiting the vertical movement of the tube. To the lower end of the tube 30 I pivotally connect a furrow opener 38 by means of bolts 40. I prefer to flatten the lower end of the tube 30 slightly, as indicated at 42, which flattened walls are positioned between the flanges 44 of the furrow opener 38.

Seed delivered to the tube 20 drops into the furrow cut by the opener 38. Flanges 44 which extend to the lower end of the opener 38 hold the furrow open, and the seed falls to the bottom of the furrow. A conventional chain 50 may be connected with the tubular support 28 to drag over the furrow formed by the opener 38 for pulling additional soil into the furrow. In most cases, the loose soil tends to fill the furrow.

In seeding, it is important that the seed be sowed at a predetermined and uniform depth. Uniform depth is not attained by conventional grain drills. To secure uniform depth I connect a wheel 52 with the furrow opener 38. An extension 54 extends upwardly from the opener 38 and is provided with a slot 56 for receiving the shaft 58 which carries the wheel 52. The shaft may be reduced to provide a shoulder 60 against which one end of a spacing sleeve 62 bears. The opposite end of the spacing sleeve 62 bears against the extension 54. Each end of the shaft 58 is threaded for the reception of nuts 64 which hold the parts in assembled relation. The hub 66 of the wheel 52 is mounted upon the shaft.

Since the tube 30 is slidably mounted within the tubular support 28, the furrow opener 38 will sink into the soil, but the depth is limited by the wheel 52. The wheel 52 may be adjusted along the slot 56 for varying the depth of the furrow. In view of the pivotal connection of the furrow opener at 40, the opener may pivot within predetermined limits. In this way, the furrow opener 38 and the wheel 52 conform to surface irregularities of the soil so as to maintain uniform depth at all times.

The axis of the wheel 52 is positioned forwardly of the axis of the furrow opener 38. Thus, the wheel 52, in riding up on the surface of the field, resists rearward pivotal movement of the furrow opener 38 about its axis 40. Forces operating against the leading side of the furrow opener 38 are balanced by the pressure of the wheel 52 upon the field surface. Similarly, the load carried by the wheel 52 is balanced by the forces acting against the leading side of the furrow opener 38. As the wheel 52 passes over elevations and depressions in the soil, the furrow opener 38 may pivot forwardly or backwardly. Adjustable mounting of the furrow opener provides a degree of compensation for surface irregularities which insures uniform depth of the furrow into which the seed is dropped.

While the disc 16 is conventional, I prefer to mount the disc to rotate about an axis at right angles to the vertical. The disc performs an important function as a cutter for weeds and the like which may be found in the field. Thus, the disc cuts obstructions or presses the same into the soil so as to prevent the obstructions from interfering with the furrow opener 38. In passing over large stones, the disc will tend to impart a lifting action to the entire assembly, so that the furrow opener 38 would pass easily thereover.

I illustrate the wheel 52 as being provided with a rim 68 which fits snugly about the rim of the wheel and may be secured thereto by screws 70 passing through slots 72 in the rim 68 and threaded into the rim of the wheel 52. The rim 68 may be adjusted laterally to vary the width of the load supporting area of the wheel 52.

In Figs. 5 and 6 I illustrate the furrow opener 38 as being provided with a flange 74 which is shaped to deflect seed into the deepest part of the furrow. The flange operates to hold the furrow open so as to insure good delivery of the seed to the furrow. Because of the flanges 44 and 74, the furrow is held open sufficiently long to permit all the seed to be delivered to the same depth.

Without further elaboration, the foregoing will so fully explain my invention that others may, by applying current knowledge, readily adapt the same for use under various conditions of service.

I claim:

1. A seeder comprising a support, a disc carried by said support, a tubular member carried by said support, a tube slidably positioned within said tubular member, a furrow opener pivotally connected with one end of said tube, and a soil engaging wheel carried by the furrow opener for limiting the depth of the furrow, said disc being positioned forwardly of the furrow opener.

2. A seeder comprising a support, a tubular member carried by said support, a tube slidably mounted in the tubular member, said tubular member and said tube being positioned substantially vertically, a furrow opener pivotally connected with the lower end of the tube, and a wheel rotatably connected with the furrow opener for rotation about an axis forwardly of the pivotal connection between the furrow opener and the tube, said wheel being arranged to ride on the surface of the soil for limiting the depth of the furrow opener.

3. A seeder comprising a support, a tubular member carried by said support, a tube slidably mounted in the tubular member, said tubular member and said tube being positioned substantially vertically, a furrow opener pivotally connected with the lower end of the tube, a wheel rotatably connected with the furrow opener for rotation about an axis forwardly of the pivotal connection between the furrow opener and the tube, said wheel being arranged to ride on the surface of the soil for limiting the depth of the furrow opener, means for limiting the movement of the tube relatively to the tubular member, and means for adjusting the wheel, to vary the depth of the furrow.

4. In a grain drill, a disc supporting a casting, an upright tubular member carried by said casting, a tube slidably mounted in said tubular member, a furrow opener pivotally connected with the lower end of said tube, a wheel rotatably carried by the furrow opener, the axis of the wheel being positioned forwardly of the pivotal connection between the furrow opener and the tube, and means associated with the furrow opener for delivering grain to the furrow.

5. In a seeder, a furrow opener, means for adjustably supporting the furrow opener for adjustment in a vertical direction, said furrow opener being pivotally connected with a part of said means, means for delivering seed to the furrow opener, a depth wheel rotatably and adjustably carried by the furrow opener, the axis of the depth wheel being positioned forwardly of the pivotal connection between the furrow opener and the said part of said means.

6. In a seeder, a support including a guide, a furrow opener, a connection between the furrow opener and said guide so constructed and arranged as to permit vertical adjustment of the furrow opener, said furrow opener being pivotally connected with said connection, and a depth wheel rotatably connected with the furrow opener forwardly of its pivotal connection with said connection.

CHARLES E. HUXLEY.